US010328961B1

(12) United States Patent
Huang et al.

(10) Patent No.: US 10,328,961 B1
(45) Date of Patent: Jun. 25, 2019

(54) PACKAGING SYSTEM

(71) Applicant: Bestway Inflatables & Material Corp., Shanghai (CN)

(72) Inventors: Shuiyong Huang, Shanghai (CN); Changde Wan, Shanghai (CN); Zhibin Chen, Shanghai (CN); Haifei Chen, Shanghai (CN); Kunlong Ren, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 15/972,052

(22) Filed: May 4, 2018

(30) Foreign Application Priority Data

Mar. 29, 2018 (CN) .................... 2018 2 0434877 U

(51) Int. Cl.
*B62B 1/12* (2006.01)
*B62B 1/16* (2006.01)

(52) U.S. Cl.
CPC .............. *B62B 1/12* (2013.01); *B62B 1/16* (2013.01); *B62B 2205/12* (2013.01); *B62B 2205/14* (2013.01); *B62B 2205/24* (2013.01); *B62B 2301/05* (2013.01); *B62B 2501/062* (2013.01); *B62B 2501/065* (2013.01)

(58) Field of Classification Search
CPC . B62B 1/12; B62B 2501/062; B62B 2205/00; B62B 2205/04; B65D 5/00
See application file for complete search history.

(56) References Cited

U.S. PATENT DOCUMENTS

| | | | | | |
|---|---|---|---|---|---|
| 4,772,035 | A | * | 9/1988 | Danial | B60B 33/0002 16/30 |
| 5,375,294 | A | * | 12/1994 | Garrett | B60B 33/06 16/34 |
| 6,507,975 | B2 | * | 1/2003 | Maupin | B60B 33/0005 16/19 |
| 8,141,885 | B2 | * | 3/2012 | Fan | B60B 33/0007 16/32 |
| 9,586,442 | B2 | * | 3/2017 | Trickle | B60B 33/06 |
| 9,821,603 | B2 | * | 11/2017 | Trickle | B60B 33/06 |
| 2016/0375726 | A1 | * | 12/2016 | Trickle | B60B 33/06 280/43.11 |
| 2017/0129283 | A1 | * | 5/2017 | Trickle | B60B 33/06 |

* cited by examiner

*Primary Examiner* — Bryan A Evans
(74) *Attorney, Agent, or Firm* — AJ Moss; Dickinson Wright PLLC

(57) ABSTRACT

A packaging system includes a packaging body defining an internal cavity, an auxiliary body disposed at least partially within the internal cavity, a wheel assembly receiving chamber disposed in the auxiliary body, a support plate joined to a bottom of the packaging body, and a wheel assembly including a wheel housing pivotally mounted to the support plate. A wheel is mounted to the wheel housing, the wheel assembly being selectively disposed in an operational position or a stowed position, wherein the wheel assembly is disposed substantially within the wheel assembly receiving chamber when the wheel assembly is disposed in the stowed position and wherein the wheel assembly is disposed at least partially substantially external to the wheel assembly receiving chamber when the wheel assembly is disposed in the operational position. The packaging system according to the present disclosure can facilitate the transportation without affecting the display, stacking, loading thereof.

17 Claims, 13 Drawing Sheets

PACKAGING SYSTEM

CROSS-REFERENCE TO RELATED APPLICATIONS

This application claims the priority of Chinese Patent Application No. 201820434877.5, filed Mar. 29, 2018, which is incorporated herein by reference in its entirety.

TECHNICAL FIELD

The present disclosure generally relates to packaging system. In particular, a packaging system with selectively-deployable transportation elements is provided.

BACKGROUND

Standard shipping systems are generally known in the art. Some conventional shipping systems include simple rectangular units, or boxes, that are transported via various conveyance technologies. These conveyance technologies can include wheeled dollies, conveyor belts, ramps, skids or other technologies. However, such conventional shipping systems do not allow the selective deployment or securement of transportation technologies included with shipping system. Further, these conventional shipping systems can be cumbersome and heavy, and can thus increase the effort, time and costs needed for their transportation. Accordingly, conventional shipping systems are limited in their functionality and flexibility, and do not purposefully and effectively address these constraints. Thus, a need exists for a packaging system that increases the convenience and cost-effectiveness of product transportation. A full discussion of the features and advantages of the present disclosure is deferred to the following detailed description, which proceeds with reference to the accompanying drawings.

SUMMARY

The present disclosure seeks to overcome some limitations and other drawbacks of the prior art, and to provide new features not heretofore available.

In some aspects, the present disclosure provides a packaging system including a packaging body defining an internal cavity, an auxiliary body disposed at least partially within the internal cavity, a wheel assembly receiving chamber disposed in the auxiliary body and a support plate joined to a bottom plate of the packaging body. As wheel assembly can include a wheel housing pivotally mounted to the support plate, and a wheel can be mounted to the wheel housing. The wheel assembly can be selectively disposed in an operational position or a stowed position, wherein the wheel assembly is disposed substantially within the wheel assembly receiving chamber when the wheel assembly is disposed in the stowed position and wherein the wheel assembly is disposed substantially external to the wheel assembly receiving chamber when the wheel assembly is at least partially disposed in the operational position. The wheel can be rotationally mounted to the wheel housing.

Further, a stowed securement mechanism can releasably secure the wheel assembly in the stowed position. The stowed securement mechanism can include a stop disposed on the support plate and a protrusion disposed on the wheel housing, and the protrusion can abut the stop when the wheel assembly is in the stowed position to thereby limit relative movement between the wheel assembly and the support plate.

According other aspects of the disclosure, an operational securement mechanism can releasably secure the wheel assembly in the support plate. The operational securement mechanism can include a biased protrusion disposed on the wheel housing that releasably engages with a portion of the support plate. Compression of the biased protrusion causes disengagement of the biased protrusion and a biased protrusion receiving portion, and permits the wheel assembly to rotate from the operational position. According to other aspects, an axle that is rotationally connected to the wheel can be disposed below the bottom plate of the packaging body when the wheel assembly is disposed in the operational position.

A reinforcing layer can be disposed between the support plate and the auxiliary body, wherein the packaging body and auxiliary body include cardboard, and the support plate and wheel include plastic. The reinforcing layer includes at least one of a multilayer cardboard, plastic board, medium density fiberboard, fiberboard, plywood and honeycomb plate.

The packaging body can include a wheel assembly opening through which at least a portion of the wheel assembly pivots to enter or exit the wheel assembly receiving chamber.

According to other aspects of the disclosure, the present disclosure provides a packaging system including a packaging body having a plurality of sidewalls and a bottom plate of the packaging body, a wheel assembly receiving chamber disposed in the packaging body and a wheel assembly including a wheel housing rotationally mounted to the packaging body. A wheel can be rotationally connected to the wheel housing, and the wheel assembly can be selectively disposed in an operational position or a stowed position. The wheel assembly can be disposed substantially within the wheel assembly receiving chamber when the wheel assembly is disposed in the stowed position and wherein the wheel assembly can be disposed at least partially external to the wheel assembly receiving chamber when the wheel assembly is disposed in the operational position.

The packaging system can further include a support plate. The support plate includes a horizontal portion parallel with, and fixed to, the bottom plate of the packaging body and a vertical portion parallel with the sidewall. The wheel housing is rotationally attached to the vertical portion of the support plate. A biased protrusion can be disposed on the wheel housing. The biased protrusion releasably engages with the horizontal portion of the support plate.

The packaging system can further include a reinforcing layer, wherein the horizontal portion is fixed between the reinforcing layer and the bottom plate of the packing body. It is further contemplated that at least one of the bottom plate of the packaging body and one of the plurality of sidewalls can include cardboard.

It will be understood that the packaging system according to the present disclosure can increase the speed convenience of item transportation, and operations thereof can be simple and low-cost, without affecting the display, stacking and loading properties thereof.

BRIEF DESCRIPTION OF THE DRAWINGS

To understand the present disclosure, it will now be described by way of example, with reference to the accompanying drawings in which implementations of the disclosures are illustrated and, together with the descriptions below, serve to explain the principles of the disclosure.

DETAILED DESCRIPTION

Figure 1:
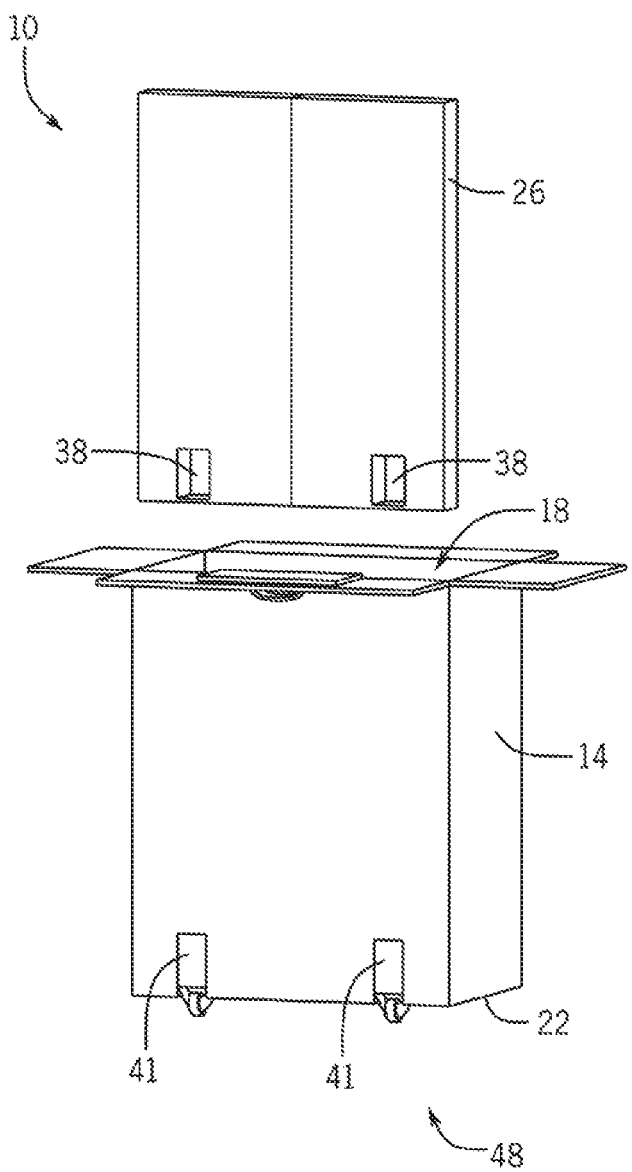
FIG. 1 is an exploded perspective view of packaging system, showing a packaging body and an auxiliary body, according to exemplary implementations of the present disclosure.

While the packaging system discussed herein may be implemented in many different forms, the disclosure will show in the drawings, and will herein describe in detail, implementations with the understanding that the present description is to be considered as an exemplification of the principles of the packaging system and is not intended to limit the broad aspects of the disclosure to the implementations illustrated.

As shown in FIGS. 1-12, a packaging system 10 is disclosed. The disclosed packaging system 10 can increase the speed and convenience of product transportation. The integrated, and retractable, nature of various transportation technologies within the packaging system 10 allows for simplified movement of products while reducing costs.

Referring now to the figures, and in particular to FIG. 1-4, the packaging system 10 includes a packaging body 14 defining an internal cavity 18 and a bottom plate 22. An auxiliary body 26 is disposed at least partially within the internal cavity 18. Items can be disposed, at least partially, within the packaging body 14, internal cavity 18 and/or the auxiliary body 26 during transportation by the packaging system 10.

According to the embodiment shown, a reinforcing layer 30 is disposed at least partially between the auxiliary body 26 and the support plate 32. The reinforcing layer 30 can include a polymer, wood, cardboard, multilayer cardboard, medium-density fiberboard, plywood, honeycomb plate, metal, or any other suitable material for supporting elements of the packaging system 10 and/or transferring mechanical loads between elements of the packaging system 10. The support plate 32 will be described below in more detail.

Figure 2:
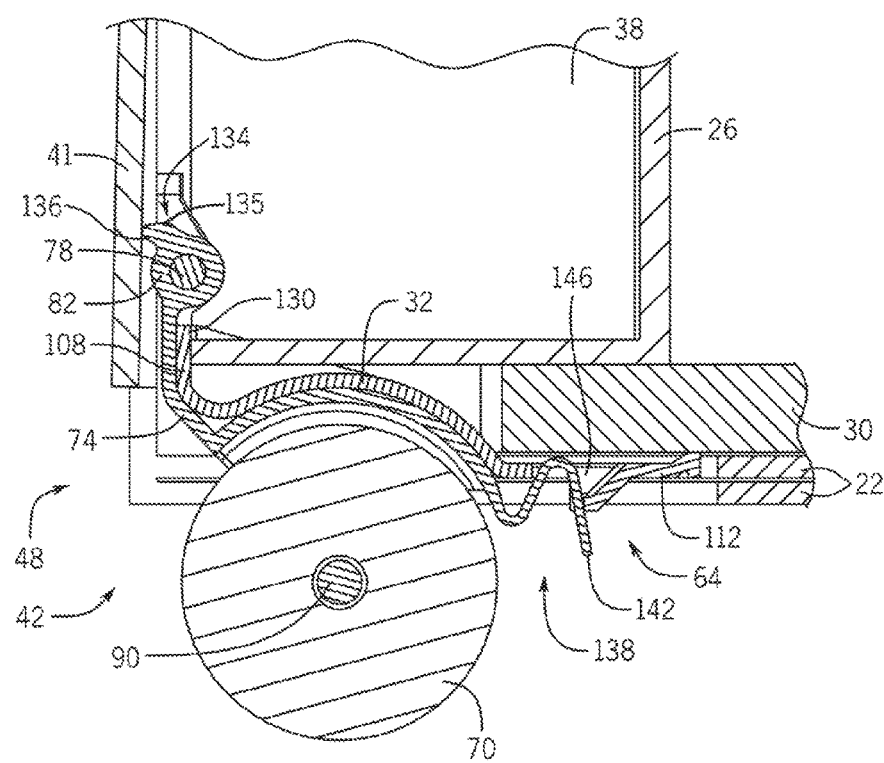
FIG. 2 is a cross-sectional view of portions of the packaging system of FIG. 1, in particular showing a wheel assembly disposed in an operational position.
Figure 3:
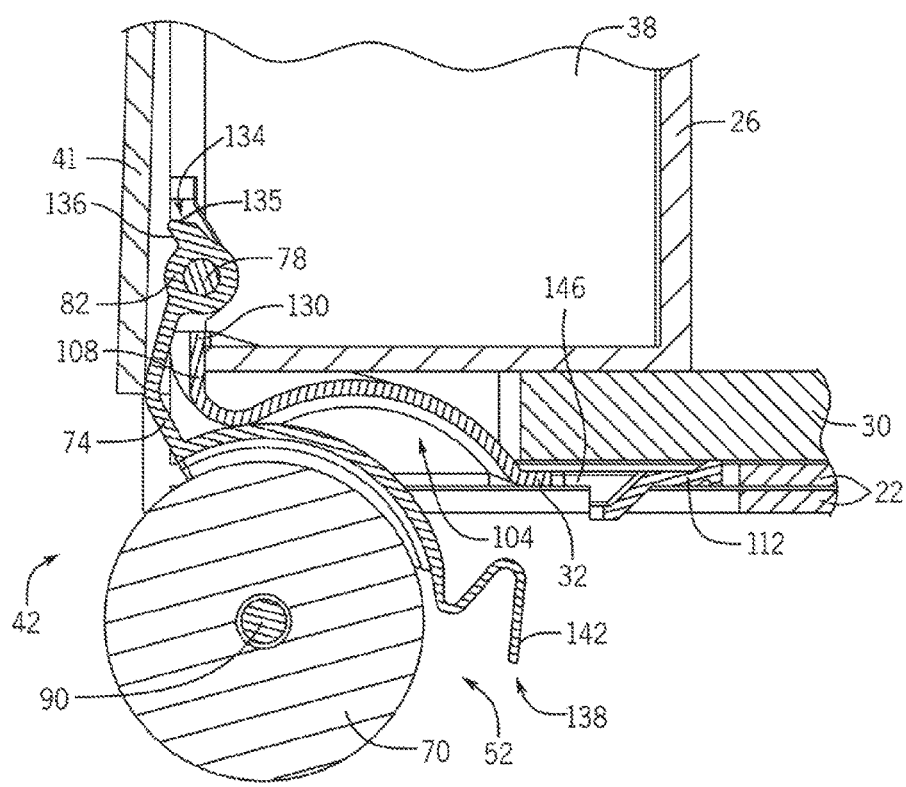
FIG. 3 is a cross-sectional view of portions of the packaging system of FIG. 1, in particular showing the wheel assembly disposed in an intermediate position.
Figure 4:
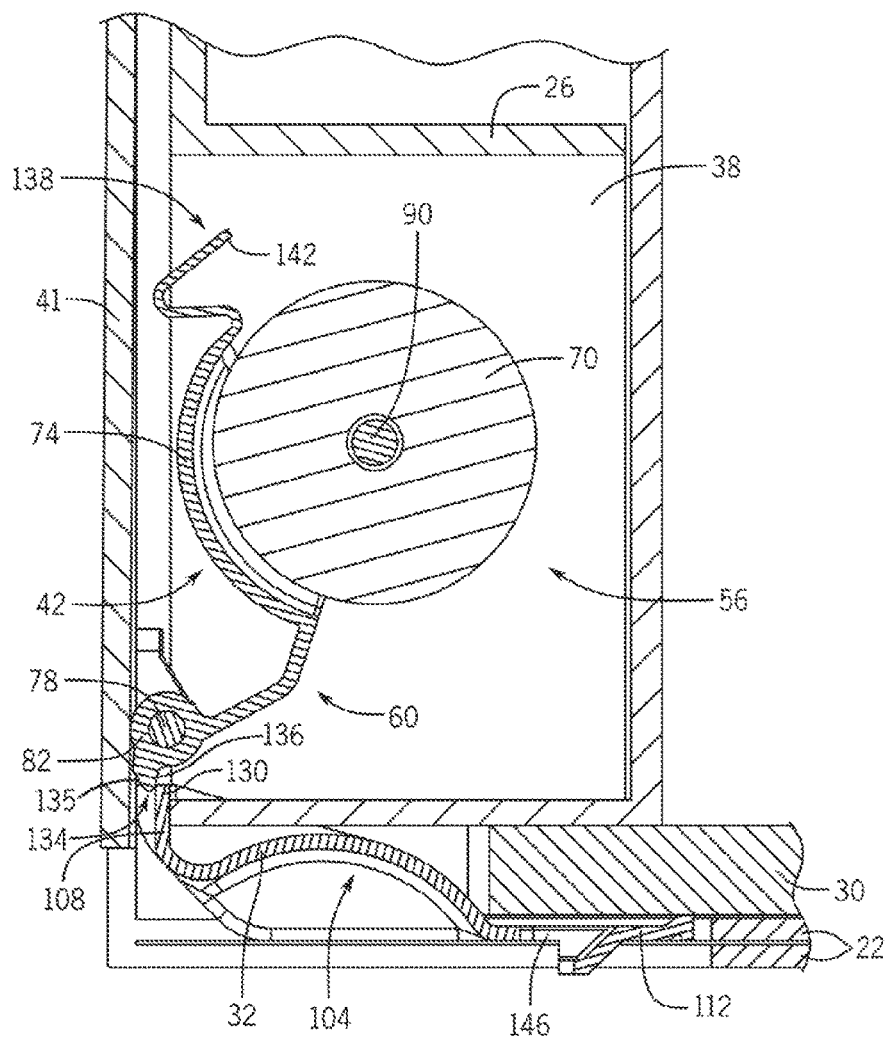
FIG. 4 is a cross-sectional view of portions of the packaging system of FIG. 1, in particular showing the wheel assembly disposed in a stowed position.

Turning to FIGS. 2-4, and initially to FIG. 2, the support plate 32, auxiliary body 26, and packaging body 14 are shown in cross section. The auxiliary body 26 includes one or more wheel assembly receiving chambers 38 for selectively housing a wheel assembly 42. The wheel assembly receiving chambers 38 can communicate with an exterior of the packaging system 10 via one or more packaging body lateral openings 40 or wheel assembly openings defined in the packaging body 14. Additionally, one or more baffles 41 can selectively open or close, or substantially open or close, the packaging body lateral openings 40. In some implementations, the baffle 41 can open the packaging body lateral opening 40 when the wheel assembly 42 transitions into, and/or out of, a stowed position 56 (described below).

In some implementations, the wheel assembly 42 is rotationally connected to one or more of the support plate 32, auxiliary body 26 and packaging body 14 such that the wheel assembly 42 is rotationally and selectively positionable in a plurality of positions relative to elements of the packaging system 10.

For example, FIG. 2 illustrates the wheel assembly 42 in an operational position 48, FIG. 3 illustrates the wheel assembly 42 in an intermediate position 52 and FIG. 4 illustrates the wheel assembly 42 in a stowed position 56. The intermediate position 52 corresponds to an arrangement where the wheel assembly 42 is disposed in a position substantially between the stowed position 56 and the operational position 48. The positions 48, 52, 56, and systems associated therewith, will now be described in further detail.

Generally, the packaging system 10 can include a stowed securement mechanism 60 and an operational securement mechanism 64. The stowed securement mechanism 60 can secure the wheel assembly 42 in the stowed position 56. In some implementations, the stowed securement mechanism 60 can releasably secure the wheel assembly 42 in the stowed position 56. In some implementations, the stowed securement mechanism 60 releasably secures the wheel assembly 42 in the stowed position 56 until a manipulation, which can be a manual manipulation by a user, of an element of the stowed securement mechanism 60 or other component of the packaging system 10 releases the wheel assembly 42 from the stowed position 56.

The operational securement mechanism 64 is operable to secure the wheel assembly 42 in the operational position 48. In some implementations, the operational securement mechanism 64 releasably secures the wheel assembly 42 in the operational position 48. According to those implementations, the operational securement mechanism 64 releasably secures the wheel assembly 42 in the operational position 48 until a manipulation, which can be a manual manipulation by a user, of an element of the operational securement mechanism 64 or other component of the packaging system 10 releases the wheel assembly 42 from the operational position 48.

Figure 5:
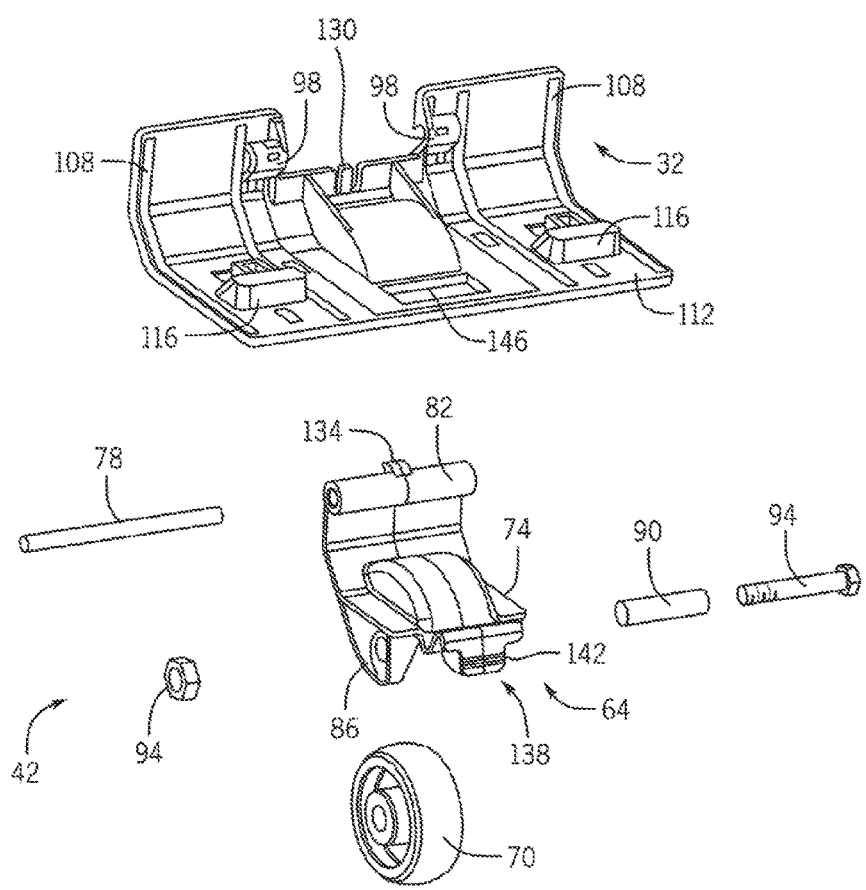
FIG. 5 is an exploded perspective view of a support plate and wheel assembly of the packaging system of FIG. 1.
Figure 6:
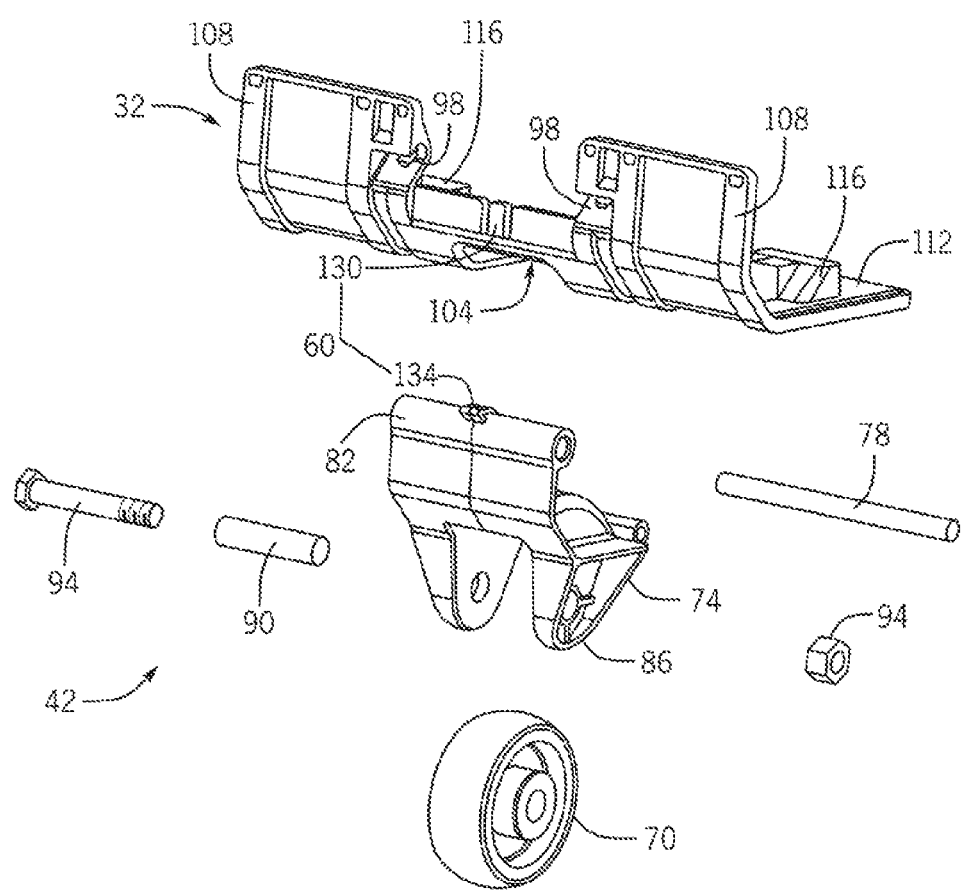
FIG. 6 is an exploded perspective view of a support plate and wheel assembly of the packaging system of FIG. 1, shown from a different perspective from that of FIG. 5.

FIGS. 5-10 illustrate the wheel assembly 42 and support plate 32. As shown in FIGS. 5 and 6, the wheel assembly 42, including a wheel 70, is rotationally coupled to a wheel housing 74 via an axle 90. The wheel 70 and the support plate 32 can include plastic, metal, metal alloy or any other suitable material. It is contemplated that the wheel housing 74 can include one or more axle brackets 86 for retaining the axle 90 in conjunction with an axle securement mechanism 94. Although the axle securement mechanism 94 is illustrated as a nut, bolt and plain bearing, any suitable mechanical coupling mechanism used for axle or shaft securement can be used without departing from the present disclosure.

The wheel housing 74, and thus the wheel assembly 42, is pivotally connected to the support plate 32 via a shaft 78. The shaft 78 is at least partially disposed within a shaft sleeve 82 defined by the wheel housing 74, and further the shaft 78 is secured to one or more shaft retainers 98 on the support plate 32, thereby forming a rotational connection between the wheel housing 74 (or wheel assembly 42) and the support plate 32.

Figure 7:
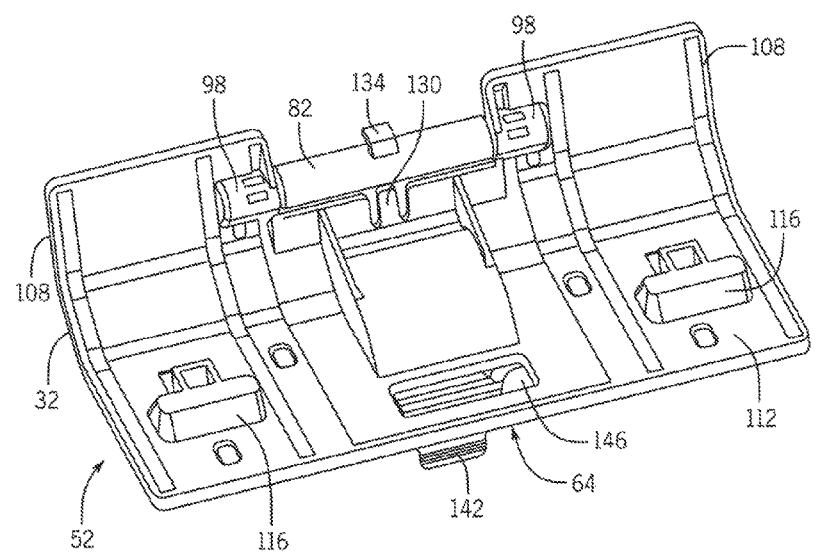
FIGS. 7, 8 and 10 are perspective views of the support plate of the packaging system of FIG. 1, in particular showing a wheel assembly disposed in the intermediate position.
Figure 8:
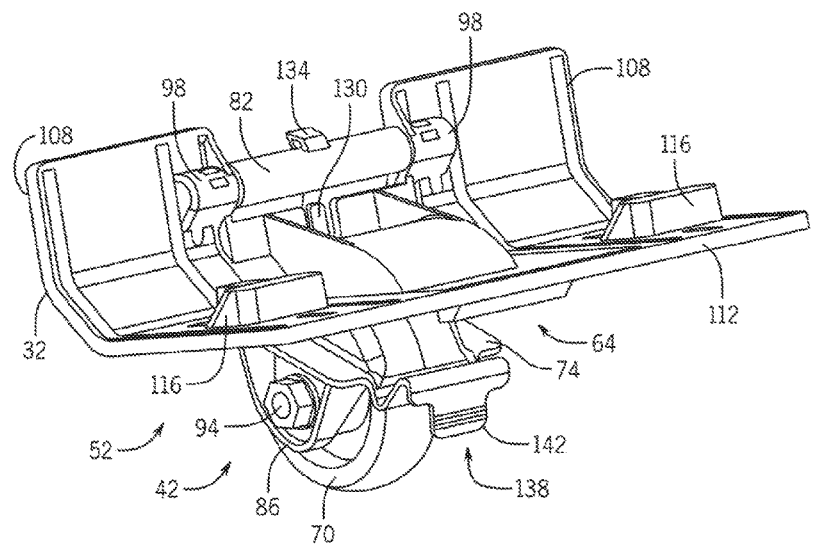
Figure 9:
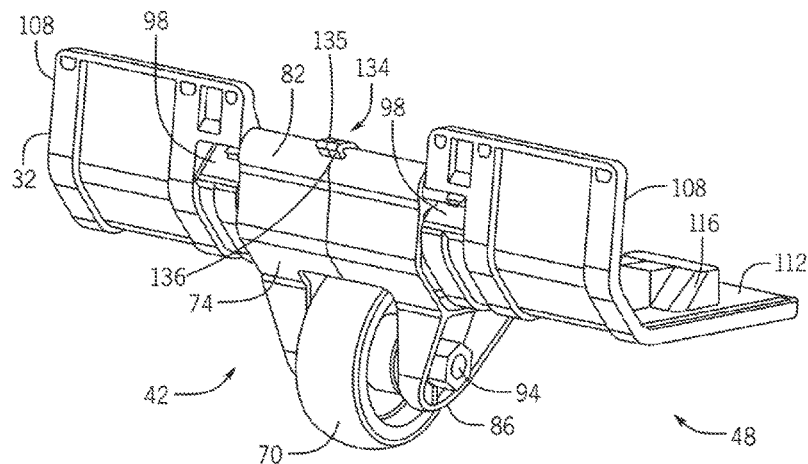
FIG. 9 is a perspective view of the support plate of the packaging system of FIG. 1, in particular showing the wheel assembly disposed in the operational position.
Figure 10:
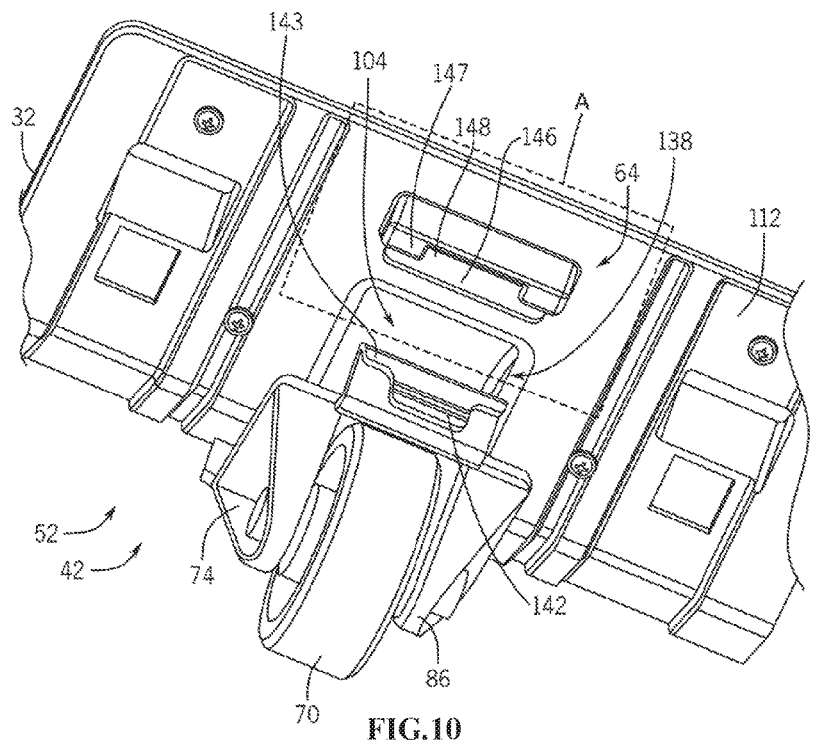
Figure 11:
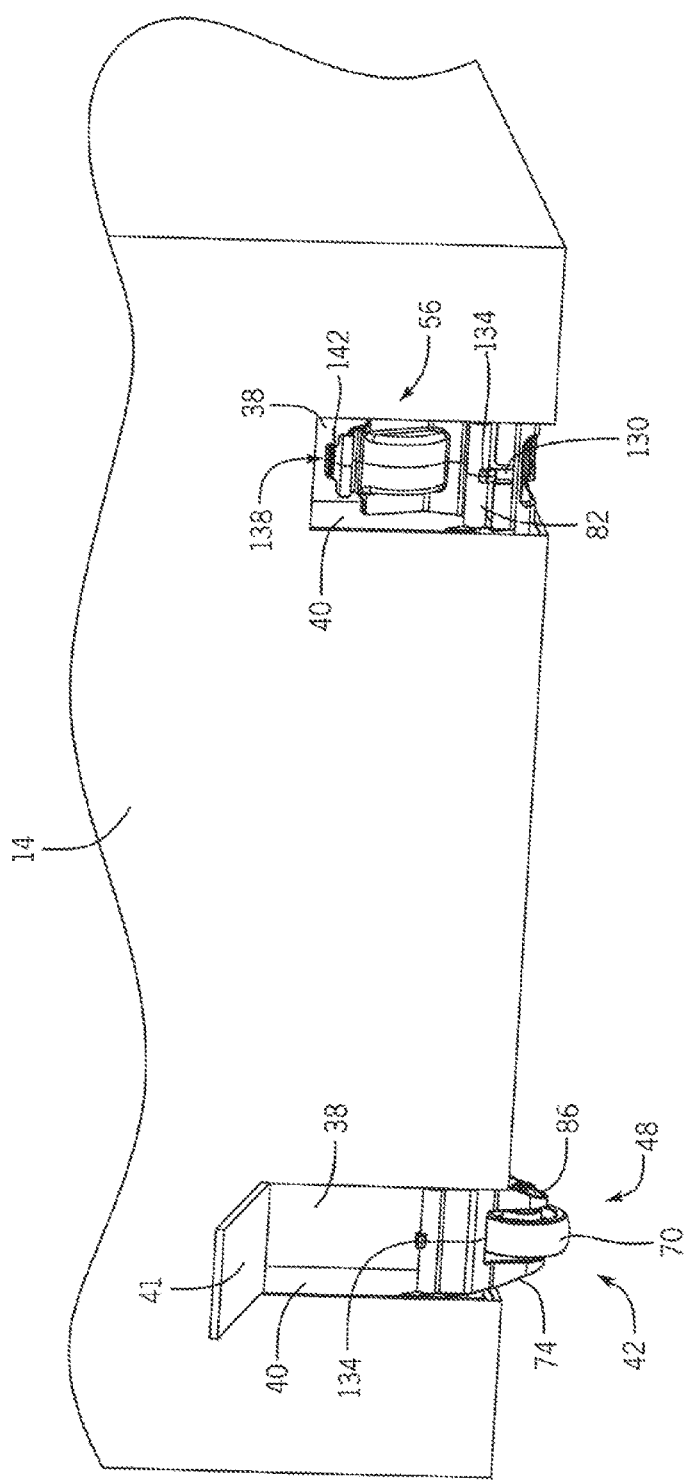
FIG. 11 is a perspective view of the packaging system of FIG. 1, in particular showing the packaging body, wheel assembly openings and elements of a stowed securement mechanism.

FIGS. 7, 8 and 10 illustrate the support plate 32 wherein the wheel assembly 42 is disposed in the intermediate position 52. FIG. 9 shows the wheel assembly 42 disposed in the operational position 48. As illustrated in FIGS. 5-10, the support plate 32 includes a support plate cavity 104, a vertical portion 108 and a horizontal portion 112. It is contemplated that the support plate cavity 104 can at least partially house the wheel housing 74 when the wheel assembly is disposed in the operational position 48.

According to one embodiment, the vertical portion 108 is disposed between the packaging body 14 and the auxiliary body 26 in the packaging system 10. Additionally, the reinforcing layer 30 is disposed between the horizontal portion 112 and the auxiliary body 26.

Figure 12:
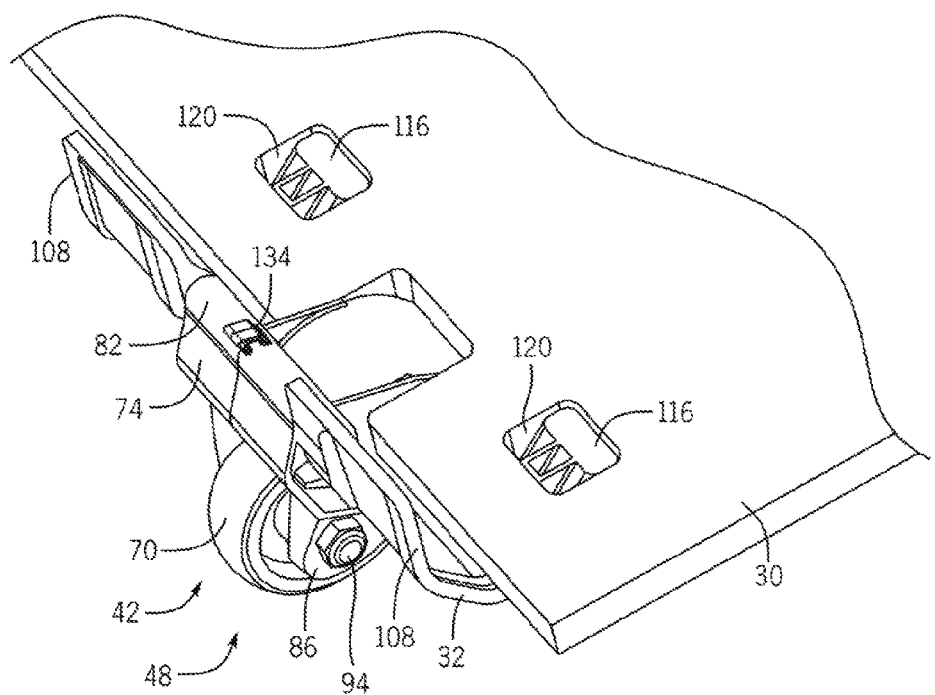
FIG. 12 is a perspective view of elements of the packaging system of FIG. 1, in particular showing portions of the wheel assembly, support plate and packaging body.

One or more support plate protrusions 116 are disposed on the horizontal portion 112 of the support plate 32. In some implementations, as illustrated in FIG. 12, the reinforcing layer 30 defines a reinforcing layer opening 120, the support plate protrusions 116 are disposed within a corresponding reinforcing layer opening 120 to thereby secure the horizontal portion 112 of the support plate 32 between the reinforcing layer 30 and the bottom plate 22 of the packaging body 14, as shown in FIGS. 2 to 4. In particular, the support plate protrusion 116 secures the horizontal portion 112 of the support plate 32 between the reinforcing layer 30 and the bottom plate 22 of the packaging body 14 via a biased arrangement of the support plate protrusion 116 and the reinforcing layer opening 120. It is also contemplated that the coupling may be accomplished by any other suitable mechanical or chemical attachment technology known to those in the art including, but not limited to, bolts, screws, fasteners, elastics, adhesives, clips and welding.

Turning to the stowed securement mechanism 60, a stop 130 is formed on the support plate 32. In some implementations, the stop 130 is disposed proximate, adjacent or between vertical portions 108 of the support plate 32, and can further protrude substantially vertically from the support plate 32. A wheel housing protrusion 134 is formed on the wheel housing 74. In some implementations, the wheel housing protrusion 134 is formed proximate, or adjacent, the shaft sleeve 82 on the wheel housing 74. When the wheel assembly 42 transitions into, or is disposed in, the stowed position 56 in the wheel assembly receiving chamber 38, further relative rotation between the wheel housing 74 and the support plate 32 is prevented as a result of contact between the wheel housing protrusion 134 and the stop 130.

Turning to the operational securement mechanism 64, the wheel housing 74 includes a biased protrusion 138. The biased protrusion 138 releasably attaches the wheel housing 74, and thus the wheel assembly 42, to at least a portion of the support plate 32. In particular, the biased protrusion 138 defines a biased manipulation portion 142. A biased protrusion receiving portion 146, or a port is defined in the support plate 32. At least a portion of the biased protrusion 138 is inserted into the biased protrusion receiving portion 146 when the wheel assembly 42 transitions into the operational position 48. Further, at least a portion of the biased protrusion 138 is disposed within the biased protrusion receiving portion 146 when the wheel assembly 42 is disposed in the operational position 48. It is contemplated by the present disclosure that the biased protrusion receiving portion 146 can be disposed in, or on, the horizontal portion 112.

Figure 13:
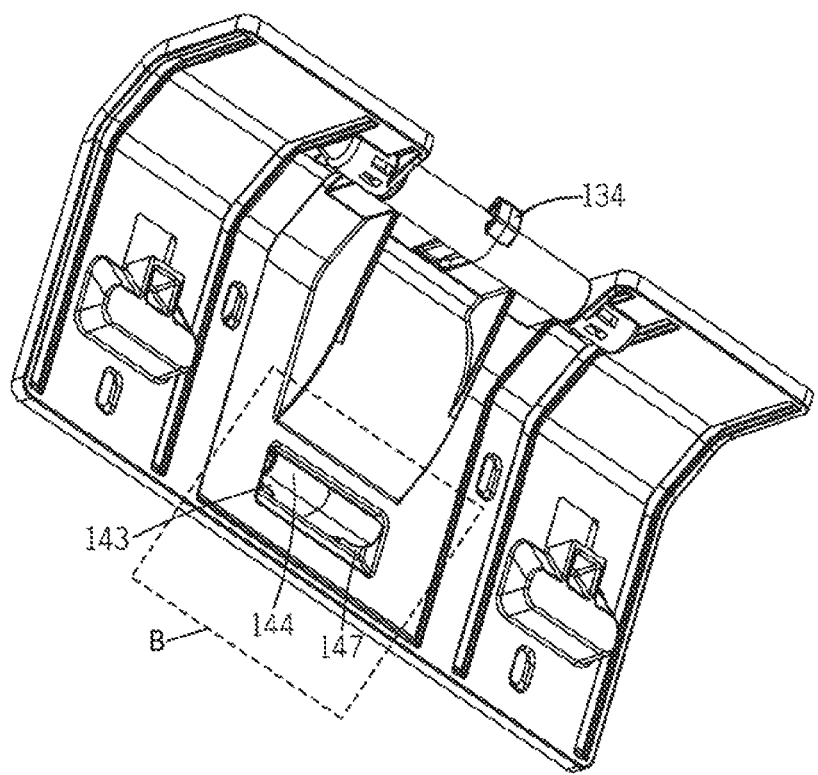
FIG. 13 is a perspective view of the support plate of the packaging system of FIG. 1, in particular showing a biased protrusion.
Figure 14:
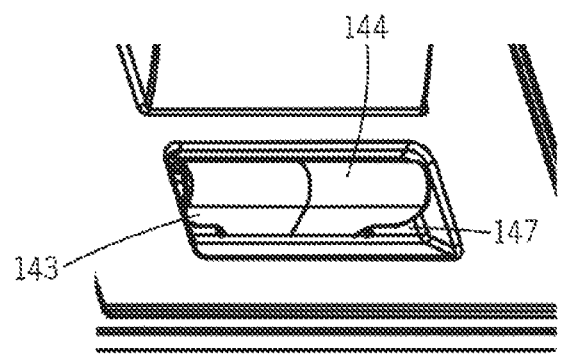
FIG. 14 is an enlarged view of area B of FIG. 13, in particular showing an engagement of the biased protrusion and a biased protrusion receiving portion.
Figure 15:
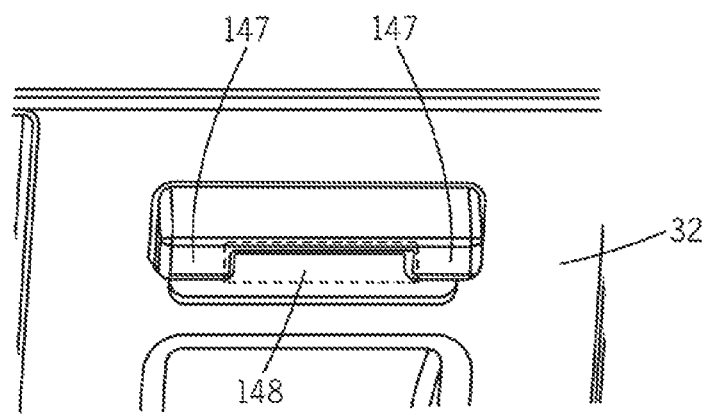
FIG. 15 is an enlarged view of area A of FIG. 10, in particular showing a slot of the biased protrusion receiving portion.

Exemplary operations of the disclosed packaging system 10 will now be described. When the wheel assembly 42 is disposed in the intermediate position 52, the wheel assembly 42 can be rotated relative to the support plate 32, and about the shaft 78, towards the operational position 48. A portion of the biased protrusion 138 is inserted into the biased protrusion receiving portion 146 when the wheel assembly 42 transitions into, or enters, the operational position 48. As a result of the relative shapes, and interaction between, the biased protrusion 138 and biased protrusion receiving portion 146, a deformation portion 144 of the biased protrusion 138 is compressed when the biased protrusion 138 partially enters the biased protrusion receiving portion 146, and the deformation portion 144 of the biased protrusion 138 is allowed to expand when the biased protrusion 138 fully enters the biased protrusion receiving portion 146. Meanwhile, the abutting portion 143 of the biased protrusion 138 abuts against the blocking portion 147 of the biased protrusion receiving portion 146, and the biased manipulation portion 142 inserts into the slot 148 of the biased protrusion receiving portion 146, the slot 148 being defined by the blocking portion 147 of the biased protrusion receiving portion 146, as shown in FIGS. 7, 13 and 14. FIG. 15 is an enlarged view of the biased protrusion receiving portion 146, in particular showing that the slot 148 is between the blocking portions 147, as shown by the dotted line box. This expansion of the deformation portion 144 of the biased protrusion 138 releasably secures the biased protrusion 138 to the support plate 32, and further can define the operational position 48.

Upon a user manipulation of the biased manipulation portion 142 of the biased protrusion 138, the deformation portion 144 of the biased protrusion 138 can compress, or change shape, such that the biased manipulation portion 142 of the biased protrusion 138 is able to disengage, or releasably separate, from the slot 148 of the biased protrusion receiving portion 146 of the support plate 32. The biased protrusion 138, and thus the wheel assembly 42, can rotate about the shaft 78 back to the intermediate position 52 and further towards the stowed position 56. In some implementations, the wheel assembly 42 is disposed substantially external to the wheel assembly receiving chamber 38 when the wheel assembly 42 is disposed in the operational position 48.

The wheel assembly 42 can enter the wheel assembly receiving chamber 38 in the auxiliary body 26 via the packaging body lateral opening 40. Rotation of the wheel assembly 42 relative to the support plate 32 can be limited by contact between the stop 130 and the wheel housing protrusion 134 as described above. Further, contact between the stop 130 and the wheel housing protrusion 134 can define the stowed position 56. The wheel assembly 42 can then be rotated back to the intermediate position 52. In some implementations, the wheel assembly 42 is disposed substantially within the wheel assembly receiving chamber 38 when the wheel assembly 42 is disposed in the stowed position 56.

In particular, when the wheel assembly 42 is rotated about the shaft 78 from the intermediate position 52 towards the stowed position 56, i.e., when the wheel 70 is rotated towards the interior of the wheel assembly receiving chamber 38, the guide surface 135 of the wheel housing protrusion 134 is rotated away from the interior of the wheel assembly receiving chamber 38. When the wheel assembly 42 is disposed in the stowed position 56, the wheel 70 is disposed in the wheel assembly receiving chamber 38, and the abutting surface 136 adjacent to the guide surface 135 contacts the stop 130. This contact prevents rotation of the wheel housing protrusion 134 towards the interior of wheel assembly receiving chamber 38, thereby preventing the wheel 70 from rotating away from the interior of the wheel assembly receiving chamber 38 and preventing the wheel 70 from exiting the wheel assembly receiving chamber 38.

When the wheel 70 is rotated out of the wheel assembly receiving chamber 38, the user applies sufficient external force to the wheel housing 74 or the wheel 70 to rotate the wheel 70 away from the interior of wheel assembly receiving chamber 38. Meanwhile, the abutting surface 136 of the wheel housing protrusion 134 compresses the stop 130 so as to rotate above the stop 130, and the guide surface 135 of the wheel housing protrusion 134 rotates towards the interior of the wheel assembly receiving chamber 38.

It will be understood that in some implementations, no portion of the wheel 70 is coplanar with the bottom plate 22 when the wheel assembly 42 is disposed in the stowed position 56. In some implementations, the axle 90 is disposed on a different side of the support plate 32 than is the auxiliary body 26 and/or the packaging body 14 when the wheel assembly 42 is disposed in the operational position 48. In other words, the axle 90 is substantially disposed below the bottom plate 22 of the packaging body 14, such that the space for the wheel assembly receiving chamber 38 required by the wheel assembly 42 can be saved, or reduced, when the wheel assembly 42 is disposed in the stowed position 56. In some alternative embodiments, the axle 90 may be disposed above the bottom plate 22 of the packaging body 14 when the wheel assembly 42 is disposed in the operational position 48.

It is to be understood that each of the operational position 48 and stowed position 56, and further a single packaging system 10 having an ability to selectively transition between the operational position 48 and stowed position 56, provide numerous benefits. The operational position 48 enables easy product or package movement without the need for external lifts, dollies or transportation devices. The stowed position 56 enables efficient packaging system 10 stacking and further protects elements of the wheel assembly 42 when not in use.

One or more of the above-disclosed elements can include a flexible thermoplastic material and/or a rigid material. Elements can be joined to other elements by one or more of high frequency welding, adhesion, screws, nails, bolts, clips and any other mechanical attachment system commonly known to those skilled in the art. Additionally, it is to be understood that all described elements and features in this disclosure can include any number of materials including, but not limited to, polymers, rubbers, foams, metals or any other suitable material known to those skilled in the art.

While some implementations have been illustrated and described, numerous modifications come to mind without significantly departing from the spirit of the disclosure, and the scope of protection is only limited by the scope of the accompanying claims.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each article of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A packaging system, comprising:
    a packaging body defining an internal cavity;
    an auxiliary body disposed at least partially within the internal cavity;
    a wheel assembly receiving chamber disposed in the auxiliary body;
    a support plate joined to a bottom plate of the packaging body;
    a reinforcing layer disposed between the support plate and the auxiliary body;
    a wheel assembly including a wheel housing pivotally mounted to the support plate; and
    a wheel mounted to the wheel housing;

wherein the wheel assembly is selectively disposed in an operational position or a stowed position, wherein the wheel assembly is disposed substantially within the wheel assembly receiving chamber when the wheel assembly is disposed in the stowed position and wherein the wheel assembly is at least partially disposed substantially external to the wheel assembly receiving chamber when the wheel assembly is disposed in the operational position;

wherein the wheel is rotationally mounted to the wheel housing.

2. The packaging system of claim 1, wherein a stowed securement mechanism releasably secures the wheel assembly in the stowed position.

3. The packaging system of claim 2, wherein the stowed securement mechanism includes a stop disposed on the support plate and a protrusion disposed on the wheel housing, the protrusion abutting the stop when the wheel assembly is in the stowed position to thereby limit relative movement between the wheel assembly and the support plate.

4. The packaging system of claim 1, wherein an operational securement mechanism releaseably secures the wheel assembly in the support plate.

5. The packaging system of claim 4, wherein the operational securement mechanism includes a biased protrusion disposed on the wheel housing that releasably engages with a portion of the support plate.

6. The packaging system of claim 5, wherein a compression of the biased protrusion causes a disengagement of the biased protrusion and a biased protrusion receiving portion, and permits the wheel assembly to rotate from the operational position.

7. The packaging system of claim 1, wherein an axle, rotationally connected to the wheel, is disposed below the bottom plate of the packaging body when the wheel assembly is disposed in the operational position.

8. The packaging system of 1, wherein the packaging body and auxiliary body include cardboard, and the support plate and wheel include plastic.

9. The packaging system of claim 8, wherein the reinforcing layer comprises at least one of a multilayer cardboard, plastic board, medium density fiberboard, fiberboard, plywood and honeycomb plate.

10. The packaging system of claim 9, wherein the packaging body includes a wheel assembly opening through which at least a portion of the wheel assembly pivots to enter or exit the wheel assembly receiving chamber.

11. A packaging system, comprising:
a packaging body including a plurality of sidewalls and a bottom plate;
a support plate including a horizontal portion parallel with, and fixed to, the bottom plate of the packaging body and a vertical portion parallel with the sidewall;
a reinforcing layer, wherein the horizontal portion is fixed between the reinforcing layer and the bottom plate of the packing body;
a wheel assembly receiving chamber disposed in the packaging body;
a wheel assembly including a wheel housing rotationally mounted to the packaging body; and
a wheel rotationally connected to the wheel housing;
wherein the wheel assembly is selectively disposed in an operational position or a stowed position, wherein the wheel assembly is disposed substantially within the wheel assembly receiving chamber when the wheel assembly is disposed in the stowed position and wherein the wheel assembly is disposed at least partially substantially external to the wheel assembly receiving chamber when the wheel assembly is disposed in the operational position.

12. The packaging system of claim 11, wherein the wheel housing is rotationally attached to the vertical portion of the support plate.

13. The packaging system of claim 12, wherein a biased protrusion is disposed on the wheel housing, and the biased protrusion releasably engages with the horizontal portion of the support plate.

14. The packaging system of claim 11, wherein at least one of the bottom plate of the packaging body and one of the plurality of sidewalls includes cardboard.

15. A packaging system, comprising:
a packaging body defining an internal cavity;
an auxiliary body disposed at least partially within the internal cavity;
a wheel assembly receiving chamber disposed in the auxiliary body;
a support plate joined to a bottom plate of the packaging body;
a wheel assembly including a wheel housing pivotally mounted to the support plate; and
a wheel mounted to the wheel housing;
wherein the wheel assembly is selectively disposed in an operational position or a stowed position, wherein the wheel assembly is disposed substantially within the wheel assembly receiving chamber when the wheel assembly is disposed in the stowed position and wherein the wheel assembly is at least partially disposed substantially external to the wheel assembly receiving chamber when the wheel assembly is disposed in the operational position;
wherein the wheel is rotationally mounted to the wheel housing;
wherein an operational securement mechanism releaseably securing the wheel assembly in the support plate;
wherein the operational securement mechanism includes a biased protrusion disposed on the wheel housing that releasably engages with a portion of the support plate; and
wherein a compression of the biased protrusion causes a disengagement of the biased protrusion and a biased protrusion receiving portion, and permits the wheel assembly to rotate from the operational position.

16. The packaging system of claim 15, wherein a stowed securement mechanism releasably secures the wheel assembly in the stowed position.

17. A packaging system, comprising:
a packaging body including a plurality of sidewalls and a bottom plate;
a support plate including a horizontal portion parallel with, and fixed to, the bottom plate of the packaging body and a vertical portion parallel with the sidewall;
a wheel assembly receiving chamber disposed in the packaging body;
a wheel assembly including a wheel housing rotationally mounted to the packaging body; and
a wheel rotationally connected to the wheel housing;
wherein the wheel assembly being selectively disposed in an operational position or a stowed position, wherein the wheel assembly is disposed substantially within the wheel assembly receiving chamber when the wheel assembly is disposed in the stowed position and wherein the wheel assembly is disposed at least partially substantially external to the wheel assembly receiving chamber when the wheel assembly is disposed in the operational position;

wherein the wheel housing is rotationally attached to the vertical portion of the support plate; and wherein a biased protrusion is disposed on the wheel housing, and the biased protrusion releasably engages with the horizontal portion of the support plate.

\* \* \* \* \*